Sept. 15, 1959 M. J. MICHALETZ 2,904,363
GRIT DISTRIBUTOR FOR AUTOMOBILES
Filed Sept. 12, 1955 2 Sheets-Sheet 1

INVENTOR.
M.J. Michaletz
BY Arthur H. Sturges.
Attorney

Sept. 15, 1959  M. J. MICHALETZ  2,904,363
GRIT DISTRIBUTOR FOR AUTOMOBILES
Filed Sept. 12, 1955  2 Sheets-Sheet 2
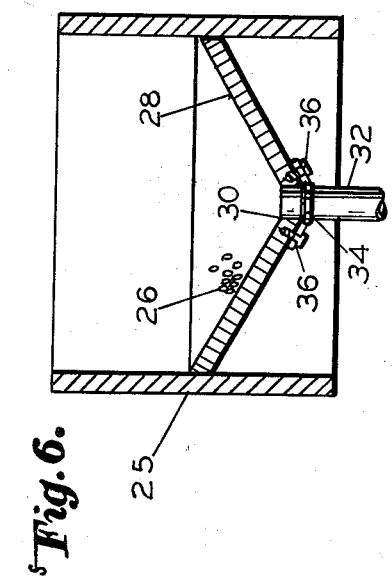
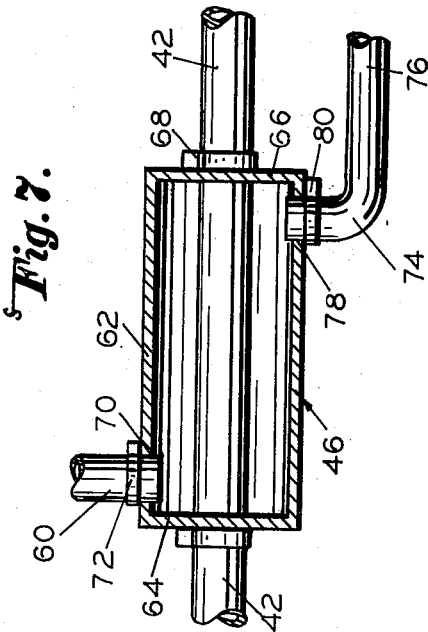
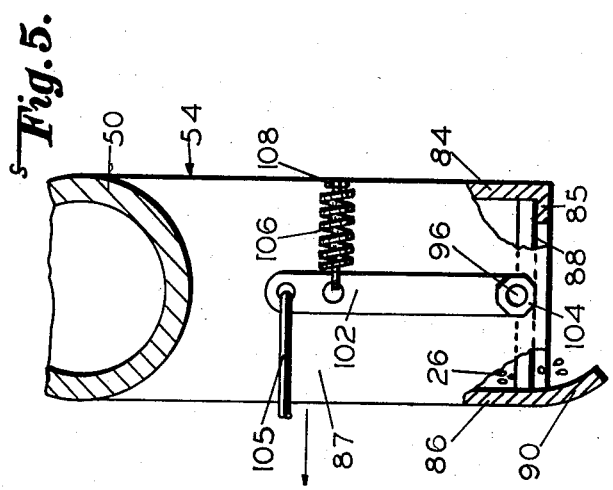
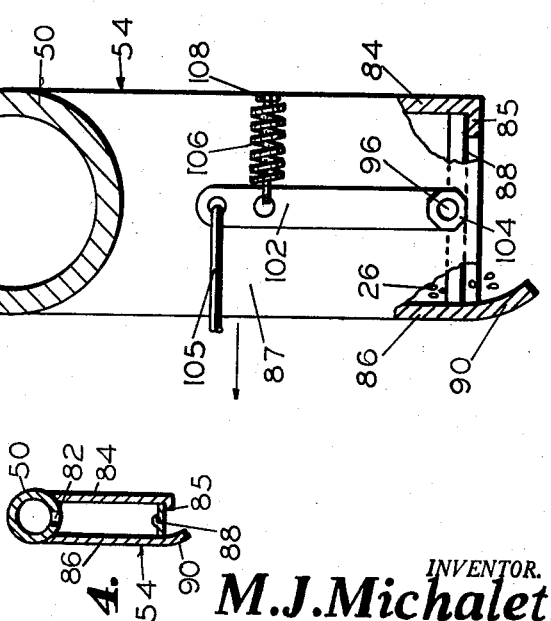
INVENTOR.
M.J. Michaletz
BY Arthur H. Sturges.
Attorney

United States Patent Office 2,904,363
Patented Sept. 15, 1959

2,904,363
GRIT DISTRIBUTOR FOR AUTOMOBILES
Martin J. Michaletz, Minneapolis, Minn.
Application September 12, 1955, Serial No. 533,539
3 Claims. (Cl. 291—19)

This invention relates to improvements in means for distributing grit, in the form of sand, fine stone or the like, in the path of the driven wheels of a vehicle, for example, the rear wheels of an automobile.

A primary object of this invention is to provide a grit distributing device which can be easily installed in an existing automobile without modifying the automobile and in a simple manner without interfering with the normal operation of the automobile, the device including a drying chamber which is communicated with the tailpipe of the automobile in simple manner.

Another important object of this invention is to provide a grit distributing device which includes a hopper that is adapted to be installed in the trunk or other rear storage space of an automobile and which is provided with an outlet means leading to distributors that are located transversely of the longitudinal axis of the automobile in front of the rear wheels, the distributors being so situated as to be not below the center of the wheels so as to be free from damage due to road hazards.

A further important object of this invention is to provide drying chambers through which the outlet means is passed, the chambers being in communication through a simple and easily installed pipe system with the tailpipe of the automobile.

A further important object of this invention is to provide means for controlling the output of the grit from the distributors, such means being operated by the operator of the automobile from his driver's position and the distributors including deflector means for ensuring the even distribution of the grit and the spreading of the grit immediately in front of the rear wheels.

Other and further objects and advantages of the invention will be understood from the following detailed description thereof.

In the drawings:

Figure 3 is a detail of the grit-dispensing means having a portion broken away and shown in detail thereof.

Figure 4 is a transverse section taken along line 4—4 of Figure 3.

Figure 5 is a view taken along line 5—5 of Figure 3, and on an enlarged scale, depicting a valve means for opening and closing the dispensing chamber.

Figure 6 is a transverse section of a hopper used in the new device.

Figure 7 is a transverse section of the drying means employed.

Figure 1:
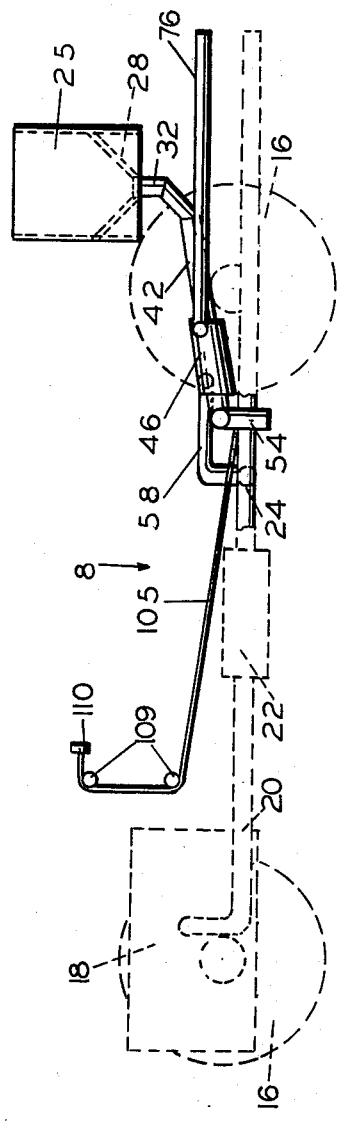
Figure 1 is a side elevation of the new device as mounted in a position of use, the vehicle being shown in dotted lines.
Figure 2:
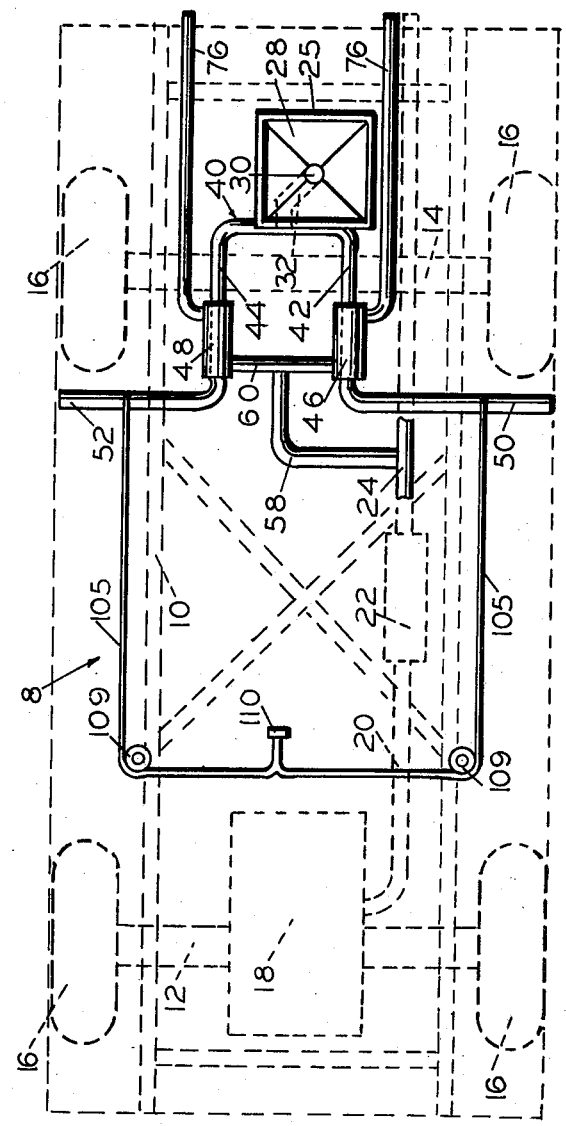
Figure 2 is a top plan view of the new device in a position of use, with the outlying portion of the vehicle in dotted lines.

It is well known that in driving an automobile during inclement weather, a great many accidents are caused because of a sliding of the vehicle on the wet, slippery, or icy pavements, roads, or the like. It is further well known that in starting to drive an automobile away from a parked position under the above-stated conditions there are times when the operator and his vehicle are caused to be stuck and unable to move due to the slipping of the rear drive wheels on ice or packed snow or the like. The instant invention seeks to overcome the aforementioned difficulty by providing a means whereby grit such as sand, crushed rock, or the like may be dispensed immediately before the rear drive wheels, and therefore providing them with a surface of such a nature that starting and stopping without the danger of slippage or the like is possible.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

Referring now more particularly to the accompanying drawings, the numeral 8 generally designates the grit distributing device of this invention which is shown in attachment to an automobile, that is partially shown in dotted lines. The automobile includes a frame 10 supporting front and rear axles 12 and 14 having wheels 16 mounted thereon and a motor 18 from which the exhaust pipe 20 extends rearwardly. The exhaust pipe 20 is provided with a muffler 22 from which the tailpipe 24 extends.

The grit distributing device 8 includes a storage hopper 25 which is adapted to be vertically disposed in a trunk or similar rear storage space of an automobile and which holds grit 26 which may be sand, fine rock or the like granular material. The hopper 25 is formed with a centrally inclined bottom wall 28 which has a center opening 30. A tubular pipe 32 is inserted at one end into the opening 30, as shown in Figure 6, the insertion of the pipe being limited by the flange 34 which is circumposed on the pipe below its end and is fastened by screws 36 to the underside of the bottom wall. Thus, the inserted end of the pipe terminates flush with the inner surface of the center of the inclined bottom wall so that the grit will constantly and easily gravitate from the hopper into the pipe.

The pipe 32 depends from the bottom wall of the hopper and is inclined downwardly and forwardly and suitably connected to the web portion 38 of a U-shaped tube 40, which has parallel downwardly and forwardly inclined tubular legs 42 and 44. The legs pass through drying chambers 46 and 48, which are identically constructed, and the legs have laterally offset and outwardly and slightly downwardly extending extensions 50 and 52 which have distributing hoppers 54 disposed on their outer ends and arranged in front of the rear wheels of the automobile.

An L-shaped pipe 58 is connected at one end to the tail pipe and has its other end connected to a pipe 60 which is arranged transversely between the drying chambers 46 and 48. As shown in detail in Figure 7, the drying chamber 46, which is identical to the chamber 48, includes a cylinder 62 which has centrally apertured end walls 64 and 66 through which the leg 42 axially extends. The cylinder 62 is held in a fixed circumposed position on the leg by collars 68, coaxially arranged with the apertures in the end walls 64 and 66. The pipe 60 has its one end secured in a radial hole 70 at one end of the cylinder by a clamping collar 72 while a lateral offset end 74 of an exhaust tube 76 is secured in a radial hole 78 at the opposite end of the cylinder by a similar clamping collar 80. The holes 70 and 78 constitute inlet and outlet holes for the exhaust gases from the tailpipe and are arranged in laterally opposed and longitudinally spaced relationship so that the gases flow within the cylinder entirely over the enclosed portion of the tubular leg. In this way, the grit flowing from the hopper through the legs 42 and 44 is heated.

The tubular extension 50 is shown in detail in Figures 3–5 with the distributor 54. The terminating end of the extension 50 is closed and the underside of the end portion of the extension is provided with longitudinally spaced ports 82 which are enclosed by the depending distributor. The distributor includes a substantially rectangular housing which has opposing side walls 84 and 86 which depend from the extension and are joined by end walls 87. The side wall 84 terminates at its lower end in a lateral, inwardly directed right angular flange 85 which constitutes a retaining track for a gate valve 88. The other side wall 86 has its lower end extended below the gate valve and slightly inturned to form a deflector or spreader plate 90 which is slanted downwardly toward the rear wheel.

The gate valve 88 is flat and rectangular in shape and has upstanding end flanges 92 from which studs 94 and 96 laterally outstand. The studs are rotatably journalled in openings 98 formed in the end walls 87 of the distributor housing. The studs are threaded and a retaining nut 100 is secured on one of the studs. An actuating arm 102 is fixed on the other stud by a nut 104 with suitable spacer washers being provided. The arm 102 extends upwardly alongside one of the end walls and is pivoted at its upper end to a cable 105. A spring 106 is connected to the arm below the upper end and extends in an opposite direction from the cable and is anchored to an outstanding lug 108 on the end wall.

The cable 105 has its ends secured to the actuating arms of each of the distributors and is entrained over guide pulleys 109 which guide the cable from the distributors to a point inside the automobile, convenient to the driver of the automobile. A suitable handle means 110 is provided on the cable for actuation of the cable from the interior of the automobile.

*Operation*

In the use of the instant invention, the hopper is situated vertically in the trunk or similar rear storage space of the automobile and is filled with grit such as sand, fine stone, crushed rock or the like. The grit gravitates through the pipe 32 into the legs 42 and 44 of the tube 40 and, in passing through the legs, the grit is heated. The exhaust gases from the tailpipe pass through the pipe 60 to the cylinders of the drying chambers and exhaust through the exhaust pipes 76. The hot gases heat the grit as it passes in the tubular legs 42 and 44 through the drying chambers.

When the driver of the automobile desires to use the grit to provide traction for the rear wheels, as when the wheels are stuck on ice, snow or the like surface, the handle means 110 is pulled to pull the cables and swing the arms 102, against the urgement of the springs 106, and swing the gate valves to the open position of Figure 5. In such position, the grit gravitates from the distributor housings, the grit sliding down the wall 86 and being spread evenly and deflected rearwardly toward the rear wheels by the spreader plate 90. When the handle means is released, the gate valves are closed by the springs 106.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and rearrangement of details and parts such as come within the purview of the invention claimed may be resorted to in actual practice, if desired.

What is claimed is:

1. In a motor vehicle grit distributor, the combination which comprises a distributing hopper positioned ahead of a driving wheel of a vehicle, a supply hopper mounted on the vehicle, a heating chamber mounted on the vehicle and positioned between the supply and distributing hoppers, a conduit extended from the supply hopper to the distributing hopper, the conduit passing through the heating chamber, a tube extended from the exhaust of an engine of a vehicle in which the distributor is positioned to the heating chamber, a tube extended from the heating chamber to a tail pipe of the vehicle, a gate in the lower end of the distributing hopper, and means for actuating the gate from the seat of an operator of the vehicle upon which the distributor is mounted.

2. In a motor vehicle grit distributor, the combination which comprises distributing hoppers mounted on a vehicle and positioned ahead of driving wheels of the vehicle, a supply hopper mounted in an elevated position on the vehicle whereby grit therefrom flows by gravity to the distributing hoppers, a gate extended across the lower end of each of the distributing hoppers, means extended from the gates to a point adjacent the seat of an operator of a vehicle upon which the distributor is installed for actuating the gates, a tube extended from the supply hopper and having branch connections extended to the distributing hoppers, drying chambers through which the branch connections extend, and tubes connecting the drying chambers to an exhaust pipe of a vehicle on which the distributing hoppers are positioned.

3. In a motor vehicle grit distributor, the combination which comprises vertically disposed distributing hoppers, the lower ends of which are openly suspended in positions forwardly of driving wheels of a vehicle, spreader plates depending from forward sides of the distributing hoppers and curved rearwardly toward the wheels in front of which the distributing hoppers are positioned, a gate extended across and pivotally mounted in the open lower end of each of the distributing hoppers, a lever extended upwardly from each of the gates, springs attached to the levers and hoppers for urging the gates to closed positions, a cable extended from upper end of each of the levers for actuating the gates from remote points, a supply hopper mounted in an elevated position whereby grit flows therefrom to the distributing hoppers, ducts extended from the supply hopper to the distributing hoppers, heating chambers positioned around the ducts leading to the distributing hoppers, intake connections extended from the heating chambers for connecting the heating chambers to heating means such as the exhaust of an internal combustion engine, and outlet connections extended from the heating chambers for connecting said heating chambers to a tail pipe of a vehicle.

References Cited in the file of this patent

UNITED STATES PATENTS

| | | |
|---|---|---|
| 527,825 | Yeager | Oct. 23, 1894 |
| 1,292,353 | Morreale et al. | Jan. 21, 1919 |
| 1,789,600 | Schoop | Jan. 20, 1931 |
| 1,850,795 | Hoffmann | Mar. 22, 1932 |
| 1,877,475 | Cowan | Sept. 13, 1932 |
| 1,888,006 | Marryatt et al. | Nov. 15, 1932 |
| 2,371,274 | Weigold | Mar. 13, 1945 |
| 2,474,291 | Warden et al. | June 28, 1949 |